(12) United States Patent
Friedman et al.

(10) Patent No.: US 6,823,281 B2
(45) Date of Patent: Nov. 23, 2004

(54) GENERATION OF CORRECTLY ORDERED TEST CODE FOR TESTING SOFTWARE COMPONENTS

(75) Inventors: George Friedman, Framingham, MA (US); Sergei Makar-Limanov, Waltham, MA (US); Michael Glik, Newton, MA (US)

(73) Assignee: Empirix Inc., Bedford, MA (US)

( * ) Notice: Subject to any disclaimer, the term of this patent is extended or adjusted under 35 U.S.C. 154(b) by 25 days.

(21) Appl. No.: 09/975,568

(22) Filed: Oct. 11, 2001

(65) Prior Publication Data

US 2002/0059039 A1 May 16, 2002

Related U.S. Application Data

(60) Provisional application No. 60/241,862, filed on Oct. 20, 2000.

(51) Int. Cl.[7] .............................................. G06F 13/00
(52) U.S. Cl. ....................... 702/119; 702/109; 702/118; 702/120
(58) Field of Search .............................. 702/79, 81, 90, 702/107, 109, 119, 120, 83, 84, 118, 182, 197; 706/50, 45; 709/203; 712/233, 300; 715/501.1

(56) References Cited

U.S. PATENT DOCUMENTS

| | | | |
|---|---|---|---|
| 5,870,539 A | 2/1999 | Schaffer ................. 395/183.14 |
| 5,930,798 A | 7/1999 | Lawler et al. ............... 707/102 |
| 5,983,001 A | 11/1999 | Boughner et al. ...... 395/183.14 |
| 6,192,511 B1 | 2/2001 | Johnston et al. ................ 717/4 |
| 6,226,692 B1 | * 5/2001 | Miloushev et al. .......... 709/316 |
| 6,266,447 B1 | * 7/2001 | Hoshi et al. ................. 382/236 |
| 6,275,956 B1 | 8/2001 | On et al. ........................ 714/38 |
| 6,292,933 B1 | * 9/2001 | Bahrs et al. .................... 717/1 |
| 6,493,425 B1 | * 12/2002 | Abe ........................... 379/1.01 |
| 6,505,342 B1 | * 1/2003 | Hartmann et al. ........... 717/104 |
| 6,609,128 B1 | * 8/2003 | Underwood ................. 707/10 |

* cited by examiner

Primary Examiner—Marc S. Hoff
Assistant Examiner—Felix Suarez
(74) Attorney, Agent, or Firm—David W. Rouille, Esq.; Chapin & Huang, L.L.C.

(57) ABSTRACT

The present invention to provide correctly ordered test code in order to effectively test software designs. There are software diagramming tools on the market today that capture software designs in a standard meta-language (UML). This software provides sequence diagrams that relate to the software component being analyzed. The UML sequence diagrams expose enough semantic content to allow the generation of test code correctly ordered. Since all of the objects are modeled consistently, the data requirements of the software component can also be determined. As a result, the generated test code is correctly ordered, thereby providing a more accurate, useful and real-world testing environment of the software component.

10 Claims, 2 Drawing Sheets

GENERATION OF CORRECTLY ORDERED TEST CODE FOR TESTING SOFTWARE COMPONENTS

CROSS REFERENCE TO RELATED APPLICATIONS

This application claims priority under 35 U.S.C. §119(e) to provisional patent application serial No. 60/241,862 filed Oct. 20, 2000; the disclosure of which is incorporated by reference herein.

BACKGROUND OF THE INVENTION

Componentized software is software that is designed to allow different pieces of the application, or "objects", to be created separately but still to have the objects work together. For this to happen, the objects must have standard interfaces that can be understood and accessed by other objects. The software language enforces some parts of these interfaces. If software interfaces are not directly available as part of the system, a discovery mechanism is employed to find the interface information. If the interfaces are not used, the software objects will not be able to work with other objects. Other practices are imposed by convention. Because these programming practices are known to everyone, the companies that create the containers can rely on them when creating the container. As a result, if these practices are not followed, the container might not operate properly. Thus, there is an indirect mechanism for enforcing these practices.

Test code can be generated by using the attributes of the platform independent language in which the software is written. Enterprise Java Beans (EJB) by Sun Microsystems, COM, DCOM, COM+ and SOAP (Simple Object access Protocol) by Microsoft Corporation and CORBA by IBM are examples of component specification standards that are commercially available. For the example of Sun JAVA language being used here, each bean has an application program interface described in a specification published by SUN Microsystems, called EJB Specification versions 1.0, 1.1, and 2.0. More particularly, each bean has a "home" interface and a "remote" interface. The "home" interface reveals information about the methods for creating or finding a remote interface in the bean. The remote interface reveals how this code can be accessed from client software. Of particular interest in the preferred embodiment, the home and remote interfaces provide the information needed to create a test program to access the bean.

Using the reflection, a program can determine what are known as the "properties" and "methods" of a bean. The properties of a bean describe the data types and attributes for a variable used in the bean. Every variable used in the bean must have a property associated with it. In this way, the software can automatically determine what methods need to be exercised to test a bean and the variables that need to be generated in order to provide stimulus to the methods.

The methods of a bean describe the functions that bean can perform. Part of the description of the method is the properties of the variables that are inputs or outputs to the method. A second part of the description of each method—which can also be determined through the reflection interface—is the command needed to invoke this method. The detailed description of the method's name, parameters and return value is specified in Remote or Home interfaces and can be also determined with Reflection API available in Java language itself. Because software can determine the code needed to invoke any method and can generate data values suitable to provide as inputs to that method, the software can generate code to call any method in the bean.

Currently, test code can be generated for testing a software component from meta-data descriptions of technology specific component interfaces. However there is not enough semantic content with respect to the code order or argument composition to generate the methods so the test execution is guaranteed to produce meaningful results (also known by the term "Realistic Test"). It is entirely possible the methods may not be in the correct order, thus the generated test code may not be testing a scenario that would likely happen during actual use of the software component. For example, for a banking application, the methods may be generated such that an account is accessed before the account has been created. The customer would have to review the order of the methods in order to insure that the method ordering was correct. The same problem arises when automated software attempts to generate parameters to the method from primitive type objects. In order to create a parameter the object software has to instantiate the object and then call some of the methods. It is not very obvious how to instantiate the object (which constructor or factory to call) and then which methods and in which order to execute on the object in order to bring the object into the state to be used as a parameter for the method.

SUMMARY OF THE INVENTION

With the foregoing background in mind, it is an object of the present invention to provide correctly ordered test code in order to effectively test software components and applications. There are software diagramming tools on the market today that capture software designs in a standard meta-language (UML). This software provides sequence diagrams that relate to the software component being analyzed. The UML sequence diagrams expose enough semantic content to allow the generation of test code correctly ordered. Since all of the objects are modeled consistently, the data requirements of the software component can also be determined. As a result, the generated test code is correctly ordered, thereby providing a more accurate, useful and real-world testing environment of the software component and applications incorporating the components.

BRIEF DESCRIPTION OF THE DRAWINGS

The invention will be better understood by reference to the following more detailed description and accompanying drawings in which.

DETAILED DESCRIPTION

Figure 1:
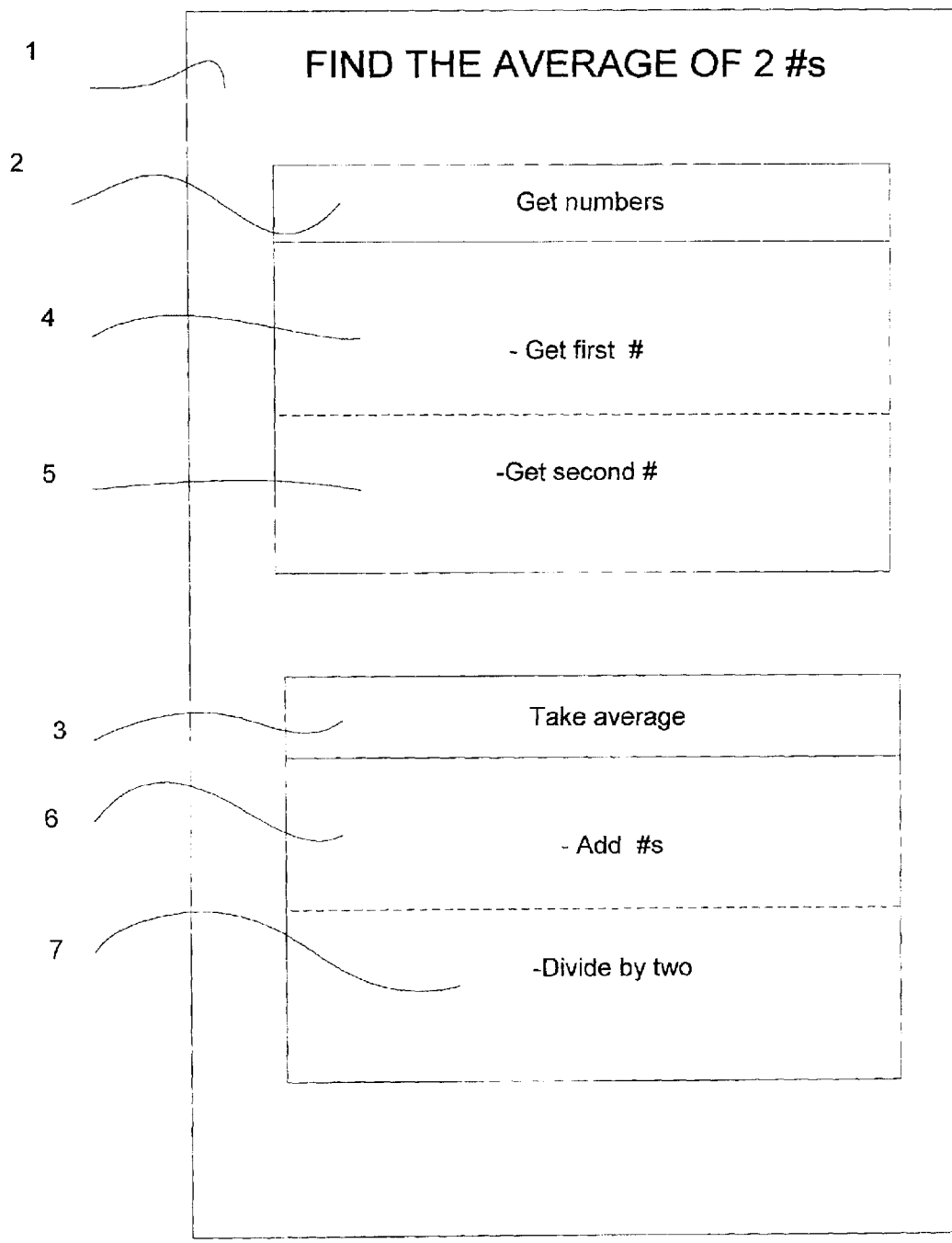
FIG. 1 is a block diagram of an application containing two software components.

Distributed computing has been used for many years. Distributed computing is very prevalently used in "enterprise-wide" applications. An enterprise-wide application is an application that allows a large group of people to work together on a common task. Usually, an enterprise-wide application performs functions that are essential to a company's business. For example, in a bank, people at every bank branch must be able to access a database of accounts for every bank customer. Likewise, at an insurance company, people all over the company must be able to access a database containing information about every policyholder. The software that performs these functions is generally known as enterprise-wide applications.

As available hardware and software has evolved, the architecture of enterprise wide applications has changed. An architecture, which is currently popular, is called the N-Tier enterprise model. The most prevalent N-tier enterprise model is a three-tier model. The three tiers are the front end, the middleware and the back end. An example of the back end may be a database. The front end is sometimes referred to as a "client" or a Graphical User Interface (GUI). The middleware is the software that manages interactions with the back end and captures the "business logic." Business logic tells the system how to validate, process and report on the data in a fashion that can be used by the front end to be useful for the people in the enterprise.

All tiers of the enterprise application may reside on multiple hardware to provide better scalability. Undesired performance degradation may occur with the increasing number of concurrent users. All of the computers are connected together through a network. Because many people use the enterprise wide application, such systems are set up to allow simultaneous users and there are many clients connected to a single server. Often, many clients will be connected to the server simultaneously.

Those familiar with Internet commerce will recognize that the N-tiered model also describes many Internet web sites that sell goods or services. For example, a web site that auctions cars is likely to fit the N-tiered model. In such an application, databases are provided to track buyers, sellers and objects being auctioned. Also, a database must be provided to track the bids as they are entered. The middleware provides the access to these databases and encapsulates the business logic around such transactions as when to accept a bid, when to declare an item sold, etc. In the world of distributed computing, it makes no difference whether the "clients" using the application are employees of a single company or many Internet users throughout the world. Herein, examples of applications under test will be given, but they are not intended to imply limitations on the use of the invention. Developers of enterprise-wide applications or web-based applications could use the inventions described herein.

One advancement in the N-tiered model is that the middleware is very likely to be componentized and is very likely to be written to a component standard so that it will easily integrate with software at other tiers. Enterprise Java Beans (EJB) by Sun Microsystems, COM, DCOM, COM+ and SOAP (Simple Object access Protocol) by Microsoft Corporation and CORBA by IBM are examples of component specification standards that are commercially available. Herein, EJB is used as an example of a component standard used to implement middleware in an N-tiered model, but it should be appreciated that the concepts described herein could be used with other component standards.

EJBs are written in the JAVA language, which is intended to be "platform independent." Platform independent means that an application is intended to deployed and perform the same functions regardless of the hardware and operating system on which it is operating. Platform independence is achieved through the use of an interpreter called a Java Virtual Machine (JVM). JVM is software that is designed for a specific platform. It provides a standardized environment that ensures the application written in the platform independent language operates correctly. The JVM is usually commercially available software and the application developer will buy it rather than create it (especially when all of them are distributed for free).

Referring to FIG. 1 a block diagram of a software module or application 1 is shown. The software module 1 contains two software components, a "Get numbers" components 2, and a "Take average" component 3. The software components may be Enterprise Java Beans or the like. The "Get numbers" component 2 includes two methods a "Get first #" method 4 and a "Get second #" method 5. Similarly, second software component 3 contains two methods, an "Add #s" method 6 and a "Divide by Two" method 7.

In order to test a software component, a test tool may be used which evaluates the component and determines the methods that comprise the components. The various methods can then be used to test the components. The methods are evaluated to determine the type of data needed to exercise them and which parameters need to be passed to them. From all this, a test can be generated which will exercise the software component by providing data to exercise the various methods making up the component.

While the above described methodology has proven to be a useful manner for testing software components, one problem associated is that the test developed for testing the software component may not be exercising the methods of the component in the proper order. In the present example the first software component 2 includes two methods. These two methods "Get first #" 4, and "Get second #" 5 can be executed in any order. Accordingly, the tests generated to exercise component "Get Numbers" 2, may execute the methods 4 and 5 in any order, since it doesn't matter which of the two numbers is obtained first or second.

The second software component 3 includes two methods, the "Add #s" method 6 and the "Divide by two" method 7. Using the previously described methodology, the "Divide by two" method 7 may be exercised before the "Add #s" method 6. This is incorrect, and thus the test would be testing a set of conditions that would never occur (not a "realistic test").

Figure 2:
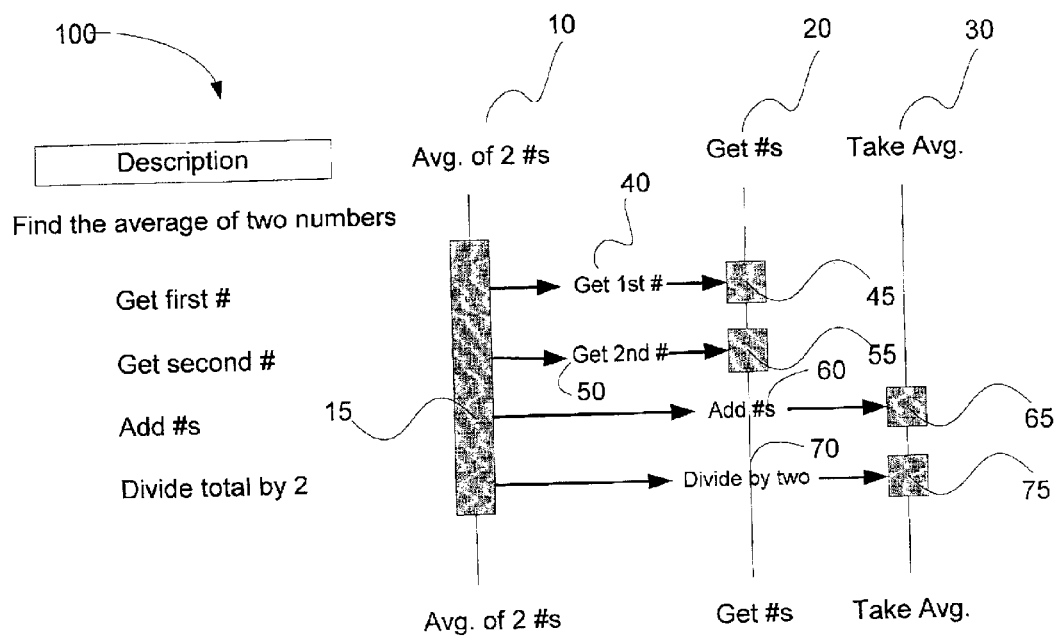
FIG. 2 is a sample sequence diagram.

In order to guarantee that the methods of the software component are properly ordered a software diagram is utilized. Referring now also to FIG. 2, a sample software diagram of a software module is shown. The software diagram, lists the methods in the order they should be executed. The application is named "Find the Average of Two Numbers" 100 and is utilized merely as an example. In actuality, the software modules are much more complex and may contain several software components.

The diagram is produced by a commercial software tool. The module 10 is shown as a vertical bar 15. The vertical bar is broken into its components and methods as shown on the additional vertical bars. Component 20 is shown comprising two smaller vertical bars 45 and 55. The second software component 30 is shown comprising two smaller vertical bars 65 and 75. It is important to note that the methods of each component are shown in the proper order that the methods are to be executed. For example, referring to component 30, it is shown that method 60 is to be executed prior to method 70 in order to obtain meaningful results.

The software diagram is produced from a standard test tool. The present invention enables a person without programming skills to make the desired selection of method calls manually by manipulating with the diagram rather than exercising code changes. Also if there are known coding patterns, and those patterns are recognized in the naming convention of the object methods, software provides an intelligent default. For example, in the case of EJB classes the software provides a default selection of the method ordering relying on the programming pattern described in EJB specification. One of these patterns is a naming convention to reassign the values of the properties of the object by providing methods names starting with a prefix get- and set- with the following property name. Accordingly, the present invention generates code calling setters (methods starting with a prefix set-) first and getters second. User can add a pattern. For example, by specifying order by the following prefix sequence: create-, add-, modify-, edit-, delete-, set-, remove-, the present invention will automatically order method calls on the side of a test driver from alphabetic:

1. addToAccount( )
2. createAccount( )
3. deleteAcount( )
4. editAccount( )

to:

1. createAccount( )
2. addToAccount( )
3. editAccount( )
4. deleteAcount( )

Also, the default order can be automatically generated from the present invention's ability to record application interaction done by the application code fragment themselves.

Accordingly, the software diagram is utilized to insure the methods of a software component are exercised in the proper order, thereby providing more accurate and meaningful testing of the component.

It should also be appreciated that computer technology is rapidly evolving and improved or enhanced versions of software components are likely to become available. It should also be appreciated that the description of one device in a class is intended to be illustrative rather than limiting and that other devices within the same class might be substituted with ordinary skill in the art.

Also, it was described that the objects being tested are EJBs, which are written in the Java language. The same techniques are equally applicable to applications having components implemented in other languages. For example, applications written according to the COM standard might be written in Visual Basic and applications written for the CORBA standard might be written in C++.

Regardless of the specific language used, these standards are intended to allow separately developed components to operate together. Thus, each must provide a mechanism for other applications to determine how to access the methods and properties of their components. However, there could be differences in the specific commands used to access components.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of correctly ordering test code for testing software components comprising the steps of:
    generating test code for testing a software component;
    utilizing a software diagramming tool to provide at least one sequence diagram of said software component; and
    ordering said test code in accordance with said sequence diagram to provide properly ordered test code.

2. The method of claim 1 wherein said software component is selected from the group comprising COM, DCOM, COM+, Corba, and EJB.

3. The method of claim 1 wherein said step of generating test code comprises the step of determining at least one method of said software component.

4. The method of claim 3 further comprising the step of evaluating said at least one method to determine the type of data required to test said at least one method.

5. The method of claim 3 further comprising the step of evaluating said at least one method to determine parameters to be passed to said at least one method in order to test said at least one method of said software component.

6. A computer program product comprising a computer usable medium having computer readable code thereon for correctly ordering test code for testing software components, the computer readable code comprising:
    instructions for generating test code for testing a software component;
    instructions for utilizing a software diagramming tool to provide at least one sequence diagram of said software component; and
    instructions for ordering said test code in accordance with said sequence diagram to provide properly ordered test code.

7. The computer program product of claim 6 wherein said software component is selected from the group comprising COM, DCOM, COM+, Corba, and EJB.

8. The computer program product of claim 6 wherein said instructions for generating test code further comprise instructions for determining at least one method of said software component.

9. The computer program product of claim 8 further comprising instructions for evaluating said at least one method to determine the type of data required to test said at least one method.

10. The computer program product of claim 8 further comprising instructions for evaluating said at least one method to determine parameters to be passed to said at least one method in order to test said at least one method of said software component.

* * * * *